United States Patent Office 3,205,140
Patented Sept. 7, 1965

3,205,140
NUCLEAR REACTOR INSTALLATION
Michel Coudray, St. Leu Foret, and Pierre Treille, St. Cloud, France, assignors to Society Indatom, Paris, France
Filed May 21, 1963, Ser. No. 281,870
Claims priority, application France, May 28, 1962, 898,907
13 Claims. (Cl. 176—19)

This invention relates to nuclear reactors, more especially of the solid-moderator, gaseous-coolant type, and its general object is to provide a reactor installation of this general type having considerably improved servicing facilities.

A nuclear reactor installation of the general class to which the invention relates includes an external shield structure defining a pressure enclosure within it. In this enclosure is positioned the core of the reactor, usually in the form of stacked blocks of moderator material defining a plurality of parallel space fuel channels containing the nuclear fuel elements. Gaseous coolant, e.g. carbon dioxide, is circulated under pressure in the enclosure through the core channels, in contact with the fuel elements therein, to remove the thermal energy generated by the nuclear reaction. This gaseous coolant is then passed through a heat exchanger where it is made to give up its heat content to a secondary fluid, which may be water in both the liquid and gaseous phases, circulated through the heat exchanger and connected in an external utilization circuit. This utilization circuit may include a set of turbines driven by the vaporized secondary fluid and constituting the output of the nuclear power plant.

In any nuclear installation servicing problems are complicated by the need for protecting the servicing personnel from the biological effects of radiation inside the shield, coupled with the consideration that reactor shutdown periods should be reduced to a minimum for obvious reasons of operational economy. Moreover, in order that the shield shall effectively perform its protecting function, the number of passages and fluid flow connections through it should be as few as possible.

It would be desirable if the heat exchange assembly in which the heat transfer from the primary coolant to the secondary fluid occurs, could be mounted within the pressure enclosure in the shield, in order to enhance the efficiency of the heat exchange function while reducing external contamination. However, such an "integrated" construction of the heat exchange assembly has heretofore raised considerable problems in respect to servicing requirements. The heat exchange assembly in a large-scale nuclear plant consists of a great number of heat exchange tubes, and should any one of these spring a leak the operation of the entire plant can be dangerously impaired unless prompt repair of the leaky tube is possible.

With the above considerations in mind, objects of the present invention include the provision of a nuclear reactor installation of the type specified including part of or all of the following advantageous features:

An integrated heat-exchange construction, i.e. heat-exchange assembly positioned within the pressure enclosure of the reactor, while yet avoiding the servicing and other difficulties heretofore generally associated with such a design;

A sectionalized construction of the heat-exchange assembly with provision for rapidly identifying a leaky section of the assembly and immediately isolating such section without having to shut down the reactor, whereupon the reactor will continue to function with only a relatively small drop in its power output, until the next normal shutdown period when the leak can be quickly and easily repaired;

An improved servicing facility in the form of a servicing chamber provided within the pressure enclosure of the reactor but comparatively shielded from the bulk of the radiation field present therein in operation and accessible from outside the shield, which chamber contains within it the connections from all of the heat exchange tubes to the external circuit for the secondary fluid, whereby the identification, isolation and repair of a defective tube or tubes will be greatly facilitated.

The above and other objects, features and advantages of the invention will become apparent from the ensuing particular description of exemplary embodiments of the invention, given by way of illustration but not of limitation with reference to the accompanying drawings, wherein.

Figure 1:
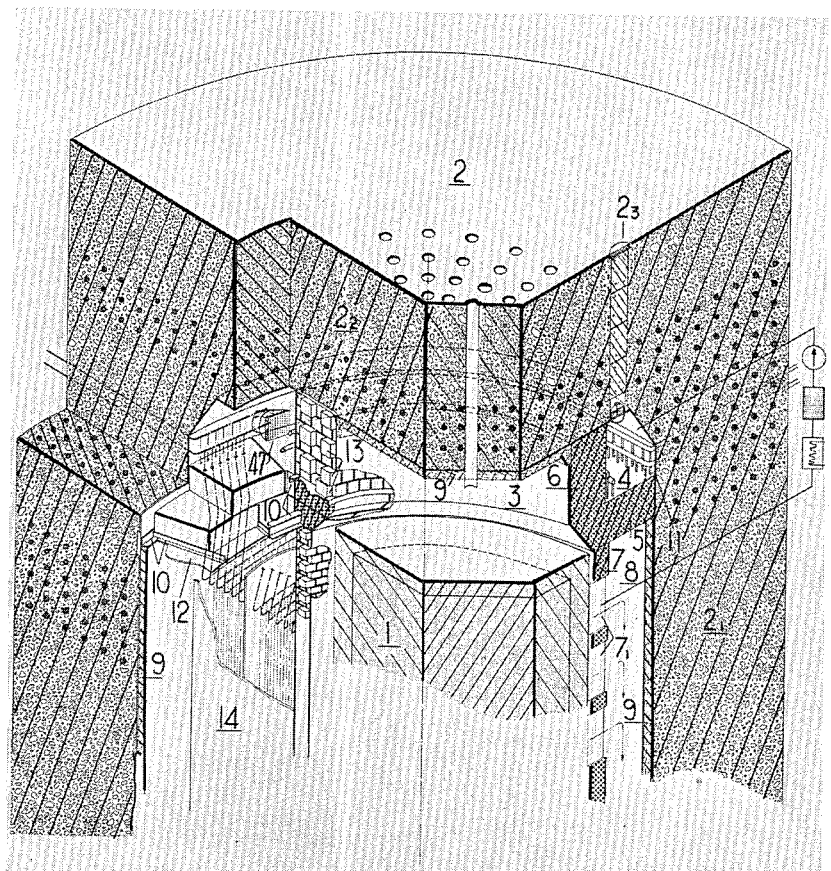
FIG. 1 is a simplified, cut-away perspective view of part of a nuclear reactor installation according to a first embodiment of the invention.

Referring first to FIG. 1, the improved reactor system shown comprises a core 1 and a surrounding shield structure 2 of prestressed concrete. The core 1 is positioned within a pressure enclosure 3 of substantially cylindrical shape defined by the inner wall surfaces of the shield. In a generally conventional manner, the reactor core 1 may have a plurality of fuel elements contained in fuel channels formed through a stack of graphite which constitutes the moderator of the reactor, and means are provided for circulating a stream of cooling gas, such as carbon dioxide, through the fuel channels of the core past the fuel elements therein. A heat shield preferably surrounds the moderator within the core and is provided with metal plating serving as thermal neutron absorbers. The above and other details of the core 1 being generally conventional and forming no part of the present invention have not been illustrated in the drawing.

In accordance with a feature of this invention, a so-called servicing chamber 4 is defined within the pressure enclosure 3 between the core 1 and the upper end wall $2_2$ of the shield 2, this servicing chamber containing a substantial part of the reactor apparatus which require servicing for maintenance and repair, including especially the connections between the tubes of the heat exchanger assembly of the reactor and the external circuit for the secondary fluid. The actual heat exchanger assembly is disposed in the shield 2 around the periphery of the core 1, as will be later described.

Access is had to the servicing chamber via a vertical passage $2_3$ or shaft through the top shield wall $2_2$ which is normally sealed, access into the chamber through said passage being only permitted during shutdown of the reactor, preferably by way of a pressure lock. The walls of the servicing chamber provide biological protection for any personnel working therein during shutdown. The servicing chamber can be considered as part of the pressure enclosure within the shield. Its chief usefulness lies in the fact that it makes it possible to provide integrated heat exchange assemblies that can be isolated at will even though they are permanently mounted within the enclosure without provision for dismantling them and removing them from out of the shield, and while also reducing the number of pipe connections that have to be effected through the walls of the shield.

In the embodiment shown in FIG. 1 the servicing chamber 4 is of generally annular shape. This shape has been adopted in conformity with the general geometry of the reactor and the means used herein for loading and unloading fuel elements into and from the core 1 through the upper shield wall $2_2$, but it will be understood (and later described with reference to FIG. 3) that the servicing chamber may well assume other forms depending on the type of loading system used.

As shown the annular servicing chamber 4 is defined externally by the inner circumferential side wall $2_1$ of the shield, the horizontal top wall $2_2$, a generally vertical inner circumferential wall 6 and a horizontal bottom wall 5. Downwardly from the servicing chamber 4, the vertical wall 6 is extended by a cylindrical partition 7 closely surrounding the core 1 and formed with radial passages $7_1$, around which an annular space 8 is defined within the side wall $2_1$ of the shield. Both said side wall $2_1$ and the top wall $2_2$ are internally lined with suitable heat lagging material 9 or provided with other suitable heat isolation. It is in the annular space 8 that the afore-mentioned heat exchange assembly is disposed, as well as blower units and other equipment required to be positioned within the pressure enclosure 3. The annular partition 7 may be of metal construction, and may include filling with a material capable of absorbing radiations and withstanding high temperatures; or it may be made of special brickwork or concrete having similar general characteristics. The inner and bottom walls 6 and 5 of the servicing chamber 4 are supported by metal framework 10 anchored to the top of the annular partition 7 and to the side wall of the shield. Any suitable reinforcing and anchoring means, not shown, may be provided at the points of support of the framework 10.

In a modification of the arrangement described, the floor of the servicing chamber may be suspended from the upper slab $2_2$ of the shield by means of vertical cables anchored in said slab and having means for accurately controlling the tension thereof. This modified construction has the advantage that it does not require any reinforcement in the shield lining in the area of support of the servicing chamber.

To provide for the afore-mentioned biological protection for people working in the servicing chamber, the walls 5 and 6 of the chamber are made of, or include, suitable radiation absorbing materials in adequate thickness, it being noted in this respect that a substantial degree of protection is already provided by the thermal shield surrounding the moderator. Further the said wall materials should of course be selected to possess proper mechanical and chemical characteristics at the operating temperatures of the reactor and should maintain their radiation absorption characteristics for long periods of time at such temperatures. Suitable materials for the walls 5 and 6 may include refractory brick, refractory concrete, as well as composite materials including steel and graphite (possibly containing boron), and steel and ordinary or boron-containing carbon. The walls 5 and 6 may be metal lined, should this be deemed desirable to prevent any tendency of the material used to disintegrate or break up superficially under the action of radiations and the mechanical or chemical actions of the cooling gas.

In the embodiment shown in FIG. 1, the under surface of the floor 5 of the servicing chamber is lined with metal sheeting 12 secured to the framework 10 for protection against radiation and erosion by the cooling gas in the manner just described. The wall itself is made of refractory concrete cast in situ and its upper surface which is relatively cool, being only exposed to considerably attenuated radiation and swept by gas at high velocity, is coated with a suitable surface composition preventing the formation of dust thereon. Said upper surface moreover can be easily cleaned and otherwise serviced during shutdown.

The vertical cylindrical inner wall 6 of the servicing chamber is herein made up from recessed metal box elements such as 13, which are rigidly bonded to the metal framework 10, as by being welded thereto at the outer wall surface and bolted at the inner wall surface. These box-like elements 13 are filled with refractory brick material, or specially molded filling elements of refractory concrete.

The annular space 8 positioned below the servicing chamber 4 and containing the heat exchanger assembly therein, is divided by means of radial partitions such as 14 into a plurality of sectors corresponding in number to that of the parallel cooling loop circuits, of which the heat exchanger assembly is comprised as will now be described.

Figure 2:
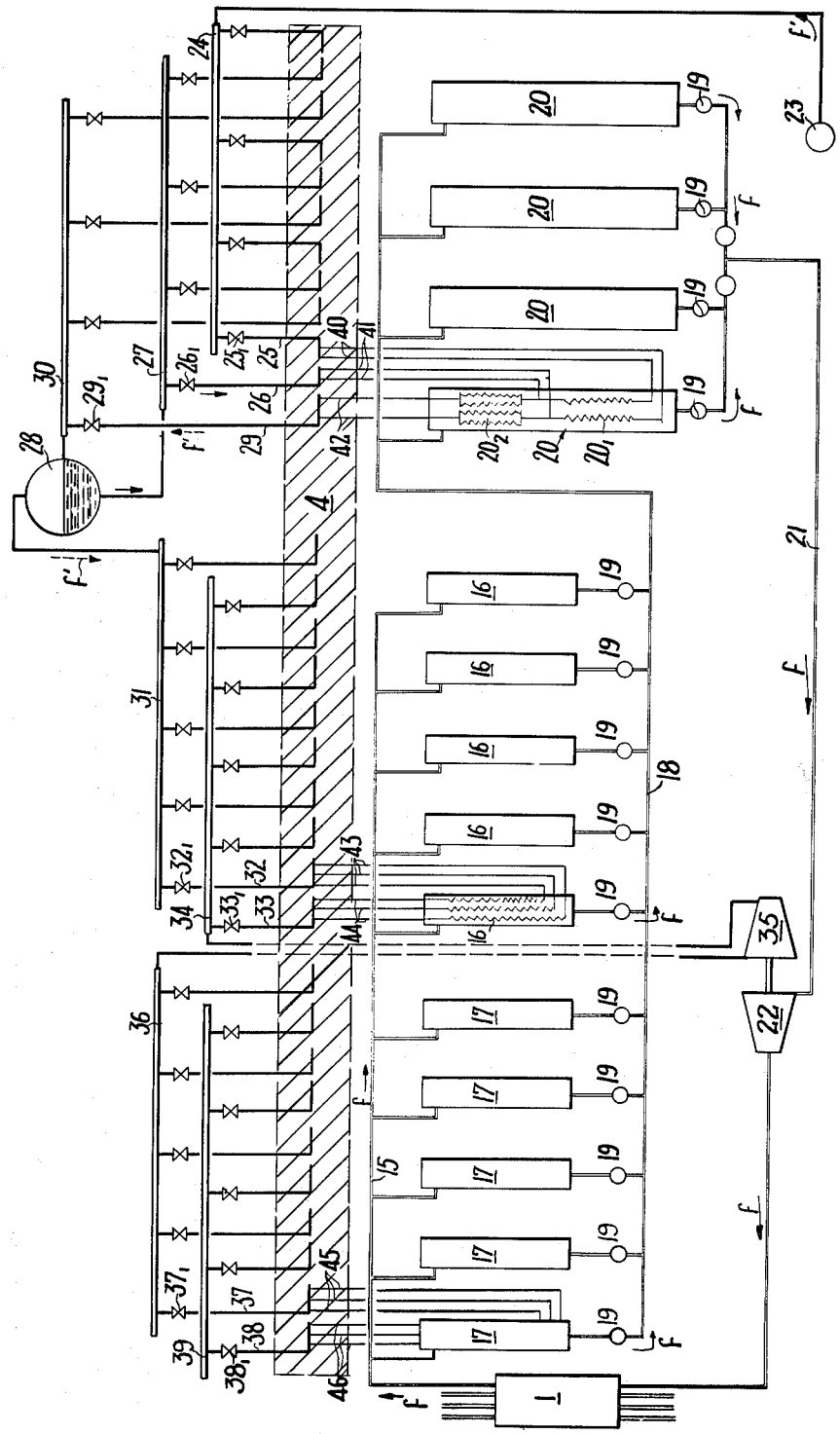
FIG. 2 is a schematic of one of the parallel cooling loop circuits of the heat exchanger assembly, usable in the installation of FIG. 1.

An examplary lay-out for one of the cooling loop circuits is shown schematically in FIG. 2. In this example, the cooling gas, e.g. carbon dioxide, flows along the path indicated by the arrows $f$. The hot gas issues from the core 1 through a conduit 15 and flows through a parallel set of superheater eelments 16, or a parallel set of re-superheater elements 17, in heat exchange relation with steam tubes provided in said elements, then into a common conduit 18, by way of moisture detector devices 19 referred to later. From the common pipe 18; the gas flows through a parallel set of units 20 each of which includes an evaporator and a preheater element in series. From the preheater, the gas flows, by way of further humidity detectors 19, to an exhaust pipe 21 and into the inlet of a blower 22 which delivers it back into the core 1. In the example illustrated, the cooling loop is seen to include five superheater elements 16, five re-superheater elements 17, and four evaporator-preheater units 20. It will be understood of course that the number of each type of element used in each loop as well as the arrangement thereof may vary widely depending on the cooling requirements of the particular reactor.

The secondary circuit of the cooling loop described contains a vaporizable fluid which flows over the path indicated by the arrows $f'$. While the secondary fluid used may vary, it will be assumed for simplicity that such fluid is water and steam. The cooling water circuit includes a set of feed pumps 23 which delivers the water into a common inlet manifold 24 from which a series of inlet conduits 25 are tapped for feeding the respective one of the evaporator-preheater units 20. As will be apparent from the heat-exchange tube system diagrammatically illustrated for the left unit of the four units 20 in FIG. 2, each of said units includes a preheater section $20_1$ comprising (herein) a pair of tubes having their inlets connected to a respective inlet conduit 25 having a cut-off valve $25_1$ therein by way of pipes 40, for reasons later described; the outlets of the preheater tubes $20_1$ are connected to the inlets of respective tube nests $20_2$ in the evaporator section of the unit 20. The outlets of the evaporator tubes $20_2$ are connected, by way of pipes 42, to an outlet conduit 29 associated with the particular unit 20, and all the outlet conduits 29 are connected, by way of separate valves $29_1$, in parallel to a common outlet manifold 30. Manifold 30 connects by way of a water-trap not shown, with a side of an overhead water-steam vessel 28, the bottom of which connects with a water inlet manifold 27. From this manifold 27, individual inlet conduits 26, including valves $26_1$, are connected by way of pipes 41, with the inlets to the evaporator tube nests $20_2$ of the related unit 20.

With this arrangement, it will be apparent that all of the water fed by pump 23 is first preheated in the preheater section $20_1$ of each preheater-evaporator unit 20, and the preheated water, together with water provided by the liquid phase tapped from the vessel 28, is passed to the evaporator section $20_2$ of the unit in which it vaporizes partially, and the resulting water-steam emulsion is passed by way of pipes 42 and conduit 29 into the wet-steam outlet manifold 30 which connects with the vessel 28 by way of a water-steam separator or trap, not shown, provided in the vessel 28.

The top of vessel 28 is connected to a steam inlet manifold 31 from which separate conduits 32 and pipes 43 lead to the respective superheater elements 16. Referring to the left superheater element 16, it will be seen that each such element includes a nest of tubes having their inlets connected to a related conduit 32 by way of pipes 43, while the outlets of the tubes are connected by way of pipes 44 and outlet conduits 33 provided with valves $33_1$ to an outlet manifold 34. Thus it is seen that wet steam from inlet manifold 31 is superheated in the superheater elements 16, and the resulting dry steam is collected in outlet manifold 34. The dry steam from outlet manifold 34 is shown as supplying turbines schematically indicated at 35 and serving to drive the blowers 22.

The spent steam escaping from the exhaust of turbines 35 is returned to an inlet manifold 36 whence it is passed by way of inlet conduits 37 provided with valves $37_1$, followed by pipes 45, to the re-superheater elements 17, which may be generally similar to the superheater elements 16. The dry steam from elements 17 is passed by way of pipes 45 and outlet conduits 38 provided with valves $38_1$ to an outlet steam manifold 39, whence the steam may be supplied to any desired utilization apparatus, such as a main turbine, not shown. The exhausted condensed steam is returned to the feed pump 23.

In accordance with the invention, the connections of the outlets from the heat exchanger tubes with the various inlet and outlet conduits 25 26, 29, 32, 33, 37 and 38, are all positioned in the servicing chamber 4, which is schematically represented in the diagram of FIG. 2 as the cross-hatched band. Generally speaking the heat exchanger as a whole is built up from elementary tube nests or "elements" with each of which is associated an inlet and an outlet conduit both extending through the reactor shield. It will be understood that the elements of the heat exchanger may each constitute a single superheating, re-superheating or other heat-exchange unit as the case may be, as is schematically illustrated in FIG. 2; or said elements might each consist of a plurality of such units so grouped that they can be simultaneously placed into and out of service by action of a cut-off valve interposed in an inlet or outlet conduit to which the plurality of elements are connected. Each inlet and outlet conduit of a heat-exchanger element is, as earlier described, fitted with a cut-off valve and all these valves are positioned outside the reactor shield so as to be accessible for actuation at any instant.

Thus it will be understood that for each of the evaporator-preheater units of the heat exchange assembly there are three conduits extending through the reactor shield, while for each of the remaining units of the heat exchange assembly there are two conduits passed through the shield, all such conduits containing water or/and steam. In case of breakdown of a tube in any one of the heat exchange elements, the defective element can immediately be identified by means of the humidity indicators 19, and the secondary (water-steam) circuit of the defective element can thereupon be isolated by acting on the appropriate valves. The reactor can then be maintained in operation for an unlimited time with a slightly reduced heat exchange capacity. Thus, in the exemplary embodiment of FIG. 2, the breakdown say of a preheater or evaporator tube would result in a reduction of only $1/16$ of the total heat exchange capacity of the corresponding circuits, while the failure of a superheater tube would similarly bring about a reduction of $1/20$ in the capacity of the superheat circuits.

When any one of the secondary cooling circuits of the heat exchanger assembly has thus been isolated, the water contents in the defective tube nest flows into the core of the reactor. Usually this is unobjectionable. However, should the amount of leakage water be deemed excessive and liable to raise problems in regard to corrosion of the fuel cladding or for other reasons, means could easily be provided for discharging such drainage water into a specially provided tank or sump. Such means may assume the form of a normally closed drain valve leading into said sump and adapted to be opened automatically on closure of the related cut-off valve.

It will be seen that the principle of subdivision of the heat exchanger circuitry into a plurality of individual or elementary circuits having means for separately isolating them in case of failure, as used in the installation described, is extremely advantageous in that it makes it possible to cut off a defective element at an instant's notice and then maintain the reactor in operation for an indefinitely long period at almost its nominal load, and that this result is attained at the cost of providing only a limited number of additional water-steam cut-off valves and pipes extending through the reactor shield. It will be evident however that in the absence of means for rather promptly repairing the defective element, a number of tubes in different elements would be liable to fail in succession thereby considerably reducing the power output of the reactor. This difficulty is avoided by the provision of the servicing chamber of the invention which makes it possible to restore the operation of a defective tube nest during the normal servicing periods of the reactor installation, with only the particular tube that has failed and caused the leaky condition, being cut off. It is for this purpose that each of the elements of the heat exchanger is connected (at its secondary, i.e. water/steam, side) to the related inlet and outlet conduits extending through the reactor shield, by way of intermediate pipes, such as 40, 41, 42, 43, 44, 45, 46 earlier referred to. These pipes extend into the servicing chamber 4 through the floor slab 5 thereof, and are connected with the related conduits 25, 26, 29, 32, 33, 37, 38, within the chamber.

The inlet and outlet are provided with inspection holes or other means facilitating access to and isolation of the particular intermediate pipe extending from the heat-exchange tube that has been identified as faulty. The appropriate pipe 40 through 46 is isolated at a point between its emergence from the floor 5 of the servicing chamber 4, and its connection with related inlet or outlet conduit.

Suitable sealing means, proportionate to the degree of radioactive pollution of the heat-transfer gas, should be provided at the points where the intermediate pipes extend through the metal plating at the under side of the floor slab 5 of chamber 4. Advantageously, the means attaching the intermediate pipes to the floor slab 5 may serve simultaneously to anchor suitable suspension means for the tube nests of the heat exchange elements underneath said floor slab. In the sections extending through the floor slab, the intermediate pipes are preferably bent so as to avoid providing a straight-line path for the radiations from the core. Such bending of the pipes will further impart some flexibility thereto and thus facilitate their proper connection to the conduits even in the presence of differential expansion. The refractory concrete constituting the floor slab 5 is cast after the intermediate pipes have been put in position, and suitable precautions are taken to allow for the considerable difference in expansion coefficients between the refractory concrete and the steel piping.

In many cases there will only be required a relatively low degree of isolation between the servicing chamber 4 and the remainder of the pressure enclosure 3. The servicing chamber need not generally constitute a separate pressure enclosure. Thus the construction of said chamber is considerably simplified. On the other hand, access into the servicing chamber is only permitted during shutdown of the reactor and after the pressure of the primary cooling fluid (such as carbon dioxide) has been substantially reduced. The servicing personnel are preferably provided with gastight suits and respiratory apparatus whereby the pressure within the shield can be held at a value intermediate between the full operating pressure and atmospheric pressure, during servicing operations. The personnel is protected from radiations emitted by the heat exchanger elements, the core and its heat shield, owing to the walls 5 and 6 of the servicing chamber. Preferably, the chamber is connected with the remaining pressure enclosure by way of a suitable conduit provided with filtering means so as to prevent the settling of radioactive matter within the servicing chamber. If desired, for increased safety, a slight over-pressure may be maintained within the servicing chamber with respect to the remainder of the pressure enclosure, as by means of a compressor provided in the connecting conduit. The conduit may further be provided with spring-biased one way valves or breakable seals.

Any suitable means may be provided, if so desired, to maintain the concrete structure surrounding the servicing chamber at a suitable moderate temperature. In the illustrated exemplary embodiment, in order to increase the volume capacity of the servicing chamber to a maximum, heat lagging has been omitted therefrom. Instead, cooling means for the servicing chamber are provided in the form of fans 47 and cooling tubes through which cooling water is circulated. Since the refractory concrete materials used in the floor and inner vertical walls of the chamber usually constitutes a good heat insulator, the temperature gradient present across said walls is steep enough for practical purposes.

For entering the chamber 4, one or more passages such as $2_3$, provided with pressure locks, are used. These entrance passages are preferably vertical as shown to facilitate insertion and extraction of a radiation protecting shield provided between the lock doors by means of conventional handling equipment.

Figure 3:
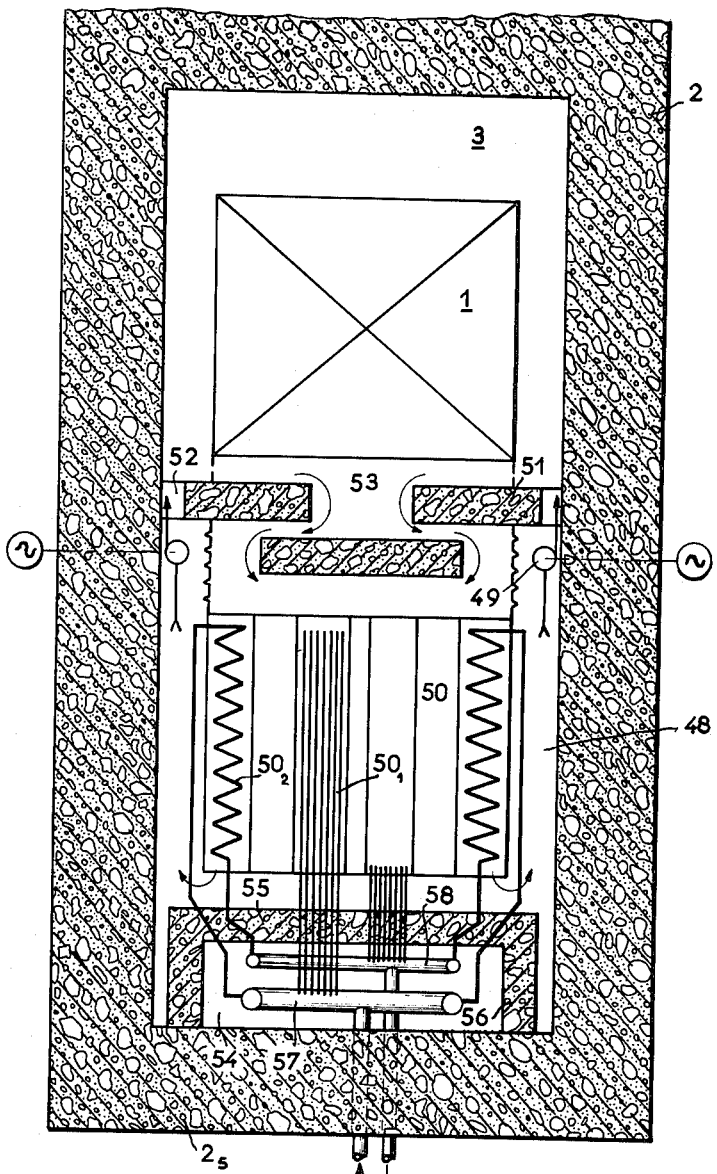
FIG. 3 is a highly simplified view in vertical section of another embodiment of the improved reactor installation.

In the modified embodiment of the invention diagrammatically illustrated in FIG. 3, the nuclear reactor comprises the sheild 2 having the pressure enclosure 3 defined in it, a servicing chamber 54 of substantially cylindrical shape provided at the bottom of the enclosure 3 and defined by the base wall $2_5$ of the shield and additional walls, including the horizontal upper wall 55 and cylindrical outer side wall 56, which generally correspond in function and structure to the walls 5 and 6 respectively of the first embodiment.

In this case the heat exchange assembly 50 is positioned within a space 48 defined in a central portion of the pressure enclosure 3, between the core 1 of the reactor and the servicing chamber 54. The primary cooling fluid flows downwardly through the core 1 and through the heat exchange elements and is returned to the upper part of the core by means of blowers such as 49. The chamber 48 is separated from the core 1 by an intermediate horizontal partition 51 of suitable protective material, and is formed with peripheral passage means 52 for the flow of the cool fluid into the core 1, and a central passage 53 of broken-line profile, as shown, for conducting the hot coolant gas from core 1 into exchanger 50.

The heat exchanger 50 is shown schematically as including elements or nests of tubes such as $50_1$ and $50_2$ extending in mutually orthogonal directions, and connected to inlet conduits such as 67 and outlet conduits such as 58 positioned in the servicing chamber 54, for the circulation of the secondary cooling fluid such as water/steam. Said conduits in turn are connected with the external water/steam circuit by means of vertical pipes extending through the bottom wall $2_5$ of the shield. The secondary heat exchange circuit may be quite similar to that shown in FIGS. 1 and 2. Also, as in the first embodiment, the servicing chamber 54 preferably contains a substantial part of the equipment involved in maintenance and repair operations during reactor shutdown. Access to the chamber 54 would in this case be had through one or more vertical passages formed through the lower shield wall $2_5$ and fitted with pressure lock and removable protecting shield.

It will be apparent that many embodiments of the invention other than the two shown and described may be conceived without exceeding the scope of the invention. The servicing chamber may be positioned at an intermediate position in the pressure enclosure within the shield, depending on the general lay-out of the reactor installation. The heat exchange assembly may depart considerably in its design characteristics and flow diagram from what was described in detail with reference to FIG. 2. Various other modifications may be introduced. Thus, to promote the cooling of the concrete adjacent the servicing chamber, additional heat exchange tubes may be provided in the spaces 3 and/or 8 (FIG. 1), connected to the intermediate conduits in the servicing chamber 4 and hence to the secondary cooling circuit.

What we claim is:

1. A nuclear reactor installation comprising a shield structure defining an internal pressure enclosure; a reactor core in the enclosure; a heat exchange assembly in the enclosure spaced from the core and comprising a plurality of elementary units each comprising a set of heat exchange tubes; means for circulating a gaseous primary cooling fluid through the core and past the heat exchange tubes; means for circulating a secondary cooling fluid through the heat exchange tubes; means providing a flow circuit for the secondary fluid externally of the shield structure; a servicing chamber in the enclosure spaced from the core and from the heat exchange assembly; wall means shielding said chamber from the core and heat exchange assembly in respect to radiations; passage means through the shield structure providing access to the servicing chamber; and flow means connecting the heat exchange tubes to said external circuit said connecting means including inlet and outlet conduit means associated with each of said units and extending from said external circuit means through the shield structure into the servicing chamber, pipes connected to inlet ends of the respective tubes in each unit and extending into said servicing chamber for connection therein with the inlet conduit means associated with that unit, and pipes connected to outlet ends of the respective tubes of each unit and extending into the servicing chamber for connection therein with the outlet conduit means associated with that unit; and cut-off valve means associated with said conduit means and operable from outside the shield structure to isolate any one of said units.

2. An installation according to claim 1, including indicator means connected to the tubes of each unit and responsive to the defective condition of any tube in the unit to provide an indication exteriorly of the shield structure.

3. A nuclear reactor installation comprising a shield defining a generally cylindrical vertical pressure enclosure therein a cylindrical reactor core in the enclosure; a heat exchange assembly in the enclosure spaced from the core and comprising a plurality of heat exchange tubes; means for circulating a gaseous primary cooling fluid generally vertically through the core and past the heat exchange tubes; means for circulating a secondary cooling fluid through the tubes; means providing a flow circuit for the secondary fluid externally of the shield; means defining a cylindrical servicing chamber in the enclosure between an end thereof and an adjacent end of the heat exchange assembly and including a horizontal wall across the enclosure for shielding the interior of the chamber from the core and heat exchange assembly and a vertical annular wall between the horizontal wall and the end wall of the enclosure; vertical passage means through a corresponding end wall of the shield providing access to said chamber; and flow means connecting the heat exchange tubes to the external flow circuit including conduits connected to the external circuit and extending through the shield into the servicing chamber, pipes connected to the respective heat exchange tubes and extending through said horizontal shielding wall into said chamber, and means within the chamber for connecting the conduits and pipes.

4. A nuclear reactor installation comprising a shield defining a generally cylindrical vertical pressure enclosure therein a cylindrical reactor core in the enclosure; a heat exchange assembly in the enclosure spaced from the core and comprising a plurality of heat exchange tubes; means for circulating a gaseous primary cooling fluid generally vertically through the core and past the heat exchange tubes; means for circulating a secondary cooling fluid through the tubes; means providing a flow circuit for the secondary fluid externally of the shield; means defining a cylindrical servicing chamber in the enclosure between an end thereof and an adjacent end of the heat exchange assembly and including a horizontal wall across the enclosure for shielding the interior of the chamber from the core and heat exchange assembly and a vertical annular wall between the horizontal wall and the end wall of the enclosure; vertical passage means through a corresponding end wall of the shield providing access to said chamber; and flow means connecting the heat exchange tubes to the external flow circuit including conduits connected to the external circuit and extending through the shield into the servicing chamber, pipes connected to the respective heat exchange tubes and extending through said horizontal shielding wall into said chamber, and means within the chamber for connecting the conduits and pipes, said heat exchange assembly comprises a plurality of elementary units each comprising a set of heat exchange tubes, and wherein said connecting means includes inlet and outlet conduit means associated with each of said units and extending from the external circuit through the shield into the servicing chamber, pipes connected to inlet ends of the respective tubes in each unit and extending through said horizontal wall into the servicing chamber for connection therein with the inlet conduit means associated with that unit, and pipes connected to outlet ends of the respective tubes in each unit and extending through the horizontal wall into the servicing chamber for connection therein with the outlet conduit means associated with that unit; and cut-off valve means associated with said conduit means and operable from outside the shield to isolate any one of said units.

5. The installation claimed in claim 1, including an annular cylindrical partition wall closely surrounding said core and defining the radially inner surface of an annular space, said heat exchange assembly being positioned within said annular space, said wall means being horizontal and extending across a longitudinal end of said annular space, said servicing chamber being annular and a vertical cylindrical annular shielding wall forming an extension of said cylindrical partition wall defining the radially inner surface of said chamber.

6. A nuclear reactor installation comprising a shield defining a generally cylindrical vertical pressure enclosure therein a cylindrical reactor core in the enclosure; a heat exchange assembly in the enclosure spaced from the core and comprising a plurality of heat exchange tubes; means for circulating a gaseous primary cooling fluid generally vertically through the core and past the heat exchange tubes; means for circulating a secondary cooling fluid through the tubes; means providing a flow circuit for the secondary fluid externally of the shield; means defining a cylindrical servicing chamber in the enclosure between an end thereof and an adjacent end of the heat exchange assembly and including a horizontal wall across the enclosure for shielding the interior of the chamber from the core and heat exchange assembly and a vertical annular wall between the horizontal wall and the end wall of the enclosure; vertical passage mean through a corresponding end wall of the shield providing access to said chamber; and flow means connecting the heat exchange tubes to the external flow circuit including conduits connected to the external circuit and extending through the shield into the servicing chamber, pipes connected to the respective heat exchange tubes and extending through said horizontal shielding wall into said chamber, and means within the chamber for connecting the conduits and pipes, said heat exchange assembly being positioned in longitudinally displaced relation to the core within the enclosure, and said servicing chamber being positioned beyond the end of said assembly remote from the core.

7. The installation claimed in claim 5, including metal frame means anchored to the shield and serving to support said horizontal and vertical walls.

8. The installation claimed in claim 4, wherein said heat exchange tubes are connected to provide a number of parallel loop circuits for said secondary cooling fluid, each loop circuit including a number of said elementary units, and there are provided radial partition walls in said annular space for separating the tubes of the respective loop circuits.

9. A nuclear reactor installation comprising a shield structure defining an internal pressure enclosure; a reactor core in the enclosure; a heat-exchange assembly in the enclosure spaced from the core and comprising a plurality of heat exchange tubes; means for circulating a gaseous primary cooling fluid through the core and past the heat exchange tubes; means for circulating a secondary cooling fluid through the heat exchange tubes; means providing a flow circuit for the secondary fluid externally of the shield structure; a servicing chamber in the enclosure spaced from the core and from the heat exchange assembly; wall means shielding said chamber from the core and heat exchanger assembly in respect to radiations; passage means through the shield structure communicating with the chamber to provide access thereto; and flow means connecting said heat exchange tubes to said external flow circuit said connecting means including conduits connected to the external circuit and extending through the shield structure into the servicing chamber, pipes connected to the respective heat exchange tubes and extending into the servicing chamber, and means connecting the conduits and pipes and positioned within the servicing chamber, and passage means connecting the servicing chamber to the remainder of the pressure enclosure for the flow of said primary gaseous fluid therethrough, and means for maintaining an over-pressure of said primary fluid in the servicing chamber, including filtering means and check-valve means in said connecting passage means.

10. The installation claimed in claim 9, including pressure lock means in the passage means providing access to the servicing chamber.

11. A nuclear reactor installation comprising a shield defining a pressure enclosure therein; a reactor core in the enclosure; a heat exchange assembly in the enclosure spaced from the core and comprising a plurality of elementary units each having a set of heat exchange tubes; means for circulating a gaseous primary fluid through the core and past the heat exchange tubes; means for circulating a secondary cooling fluid through the heat exchange tubes; means providing a flow circuit for the secondary fluid externally of the shield structure; inlet and outlet conduit means associated with each unit and extending from said external circuit through the shield; pipes connected to inlet ends of the respective tubes in each unit and to the outlet conduit means associated with that unit; indicator means connected to the tubes of each unit and responsive to the defective condition of any tube in the unit to provide an indication exteriorly of the shield; and cut-off valve means associated with said conduit means and operable from outside the shield to isolate any one of said units.

12. The installation described in claim 1 wherein said servicing chamber is arranged adjacent an end of the pressure enclosure and is defined by a corresponding end wall of the shield structure and by an adjacent horizontal wall for shielding the chamber from said heat exchange assembly and by an adjacent vertical annular wall and pipes connected to said respective heat exchange tubes and extending through said horizontal shielding wall into said chamber.

13. The installation described in claim 1 wherein said servicing chamber is partially defined by two adjacent end walls of the shield structure and by a horizontal wall for shielding said chamber from said heat exchange assembly and by a vertical annular wall and pipes connected to said respective heat exchange tubes and extending through said horizontal shielding wall into said chamber.

References Cited by the Examiner

UNITED STATES PATENTS 2,946,732  7/60  Wootton _____ 176—53

FOREIGN PATENTS 866,037  4/61  Great Britain.

REUBEN EPSTEIN, *Primary Examiner.*

CARL D. QUARFORTH, *Examiner.*